Figure 1:
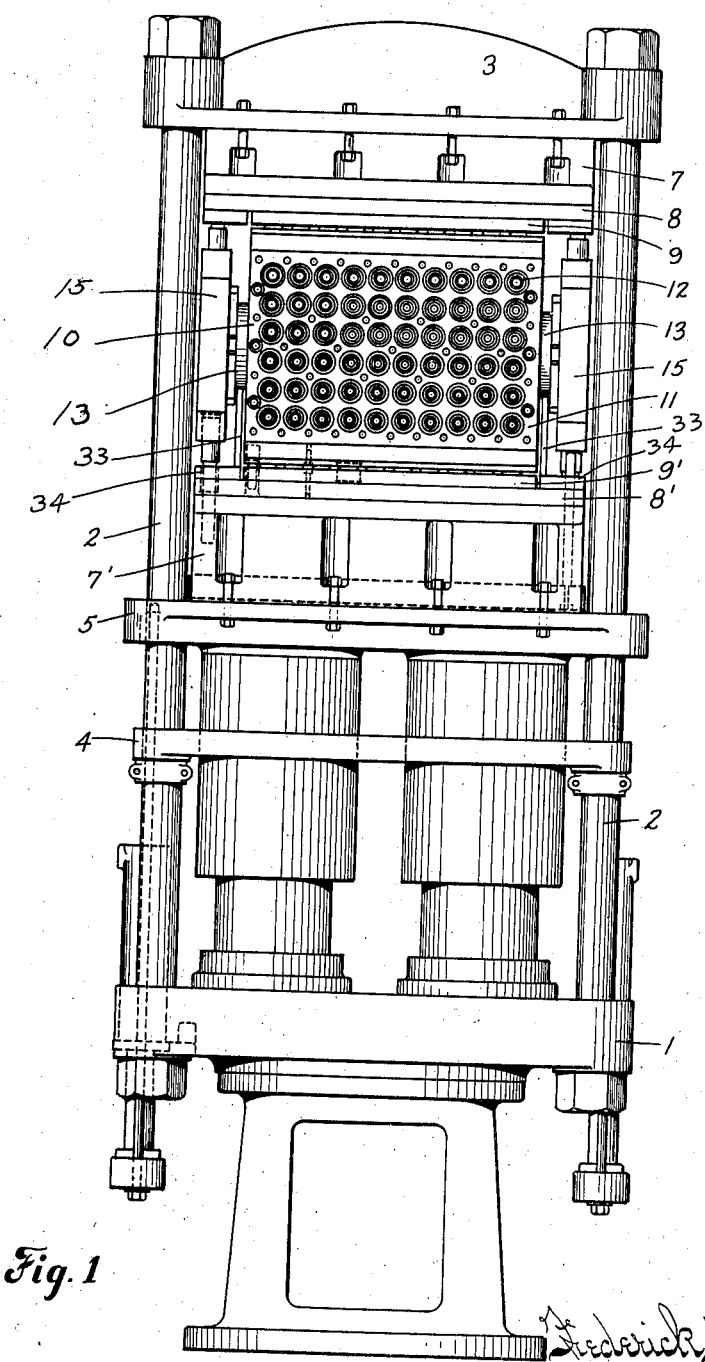

Dec. 27, 1938.   F. A. NOVAK ET AL   2,141,195
MOLDING MACHINE FOR PLASTICS
Filed March 1, 1935   3 Sheets-Sheet 1

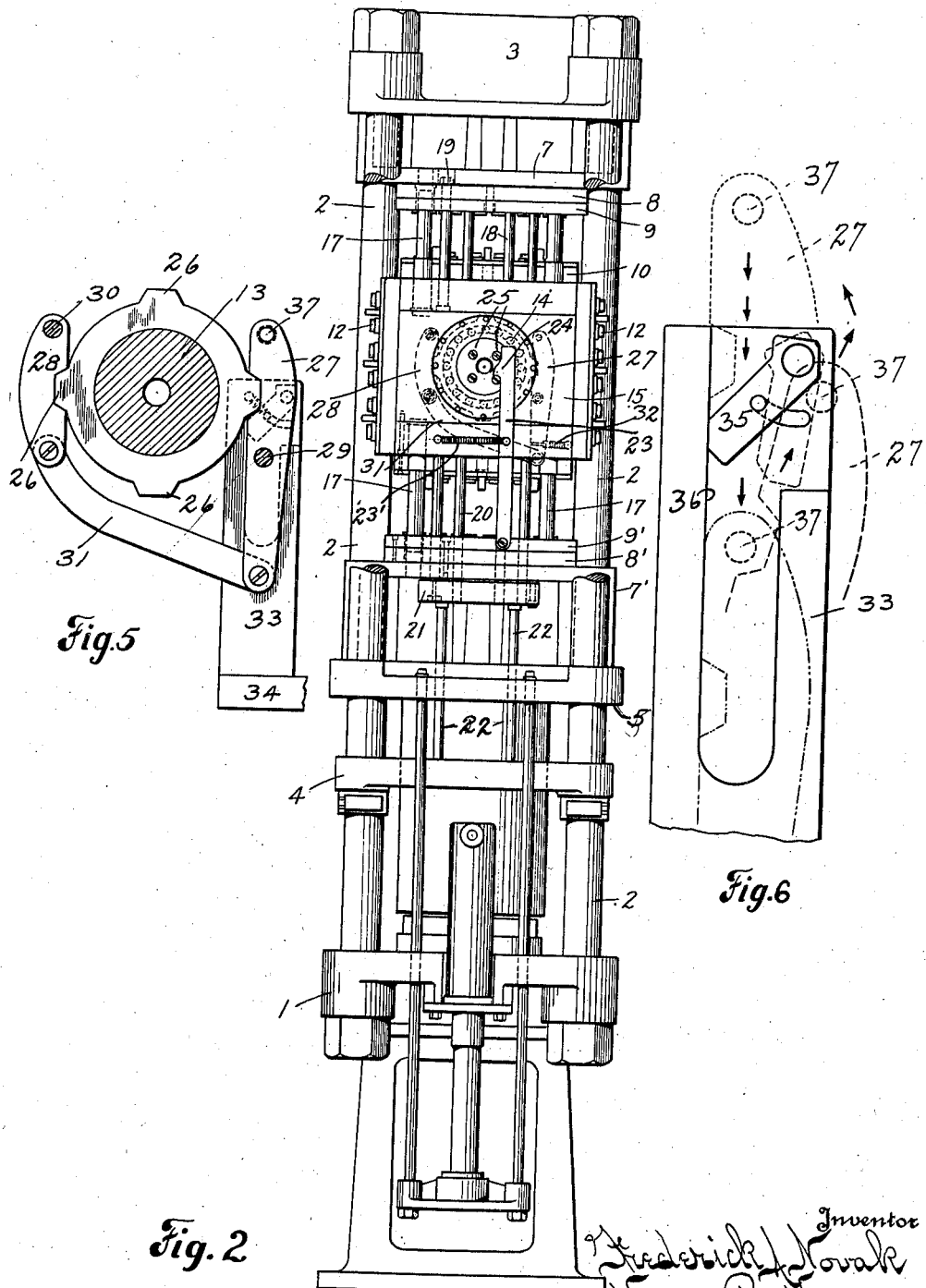

Dec. 27, 1938.  F. A. NOVAK ET AL  2,141,195
MOLDING MACHINE FOR PLASTICS
Filed March 1, 1935  3 Sheets-Sheet 3
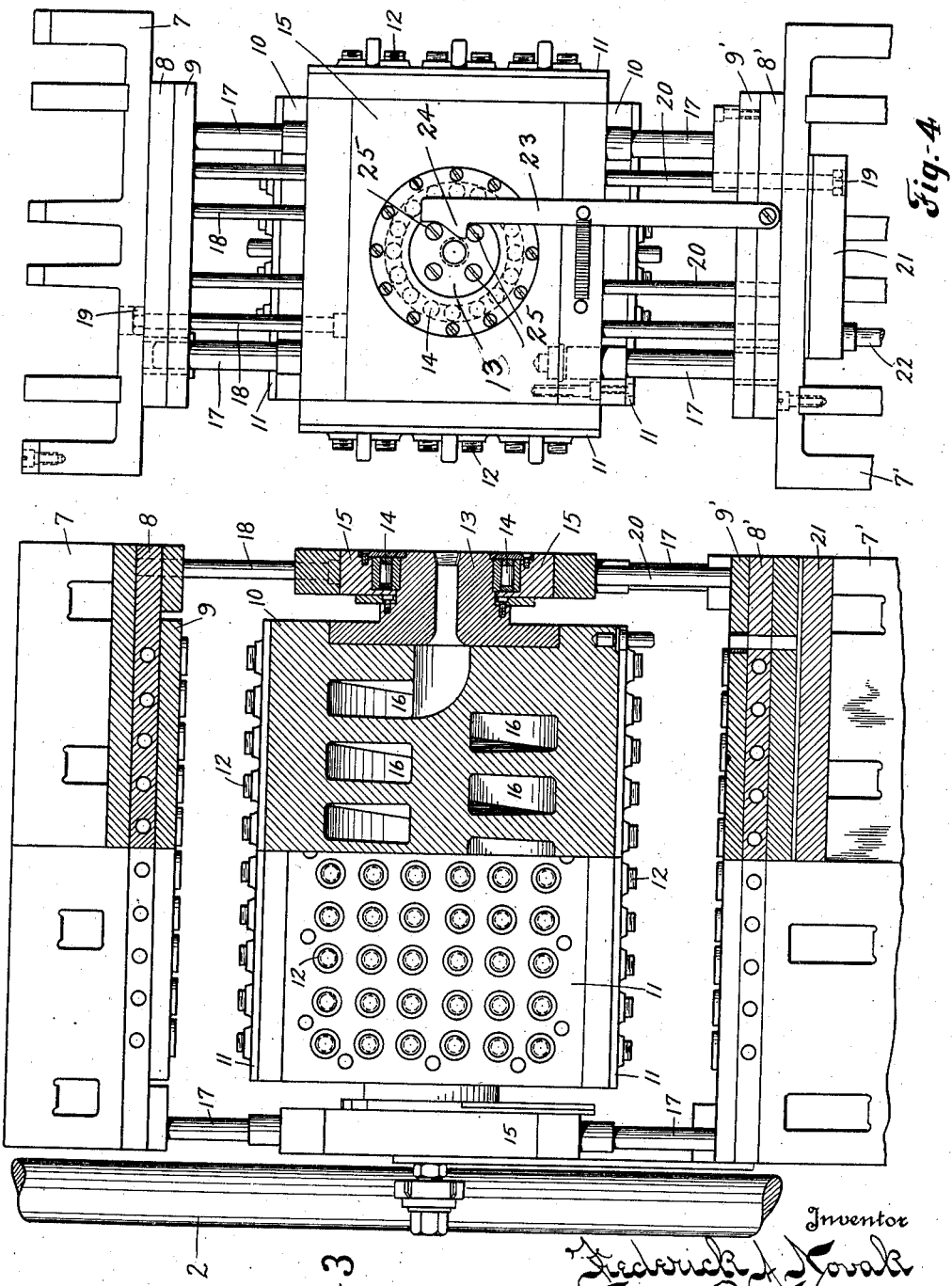

Patented Dec. 27, 1938

2,141,195

UNITED STATES PATENT OFFICE 2,141,195

MOLDING MACHINE FOR PLASTICS

Frederick A. Novak, Elyria, and Harry B. Harn, Dayton, Ohio, assignors, by mesne assignments, to Molding Service, Inc., Dayton, Ohio, a corporation of Ohio Application March 1, 1935, Serial No. 8,882

13 Claims. (Cl. 18—17)

This invention relates to apparatus for molding plastic materials of phenolic condensation or synthetic resinous character and more particularly to a press having progressive molding facilities whereby the operation is semi-continuous, enabling multiple moldings to be made while previously molded articles are being removed.

In the embodiment of the invention herein illustrated there is interposed between the platens of a molding press of conventional reciprocatory type a rotary steam heated drum which is intermittently advanced through partial rotations by successive operations of the press to automatically present succeeding form-carrying faces of the drum in molding relation with complementary mold plates carried by the press, while like faces upon which articles have been molded by the preceeding operation are presented in position for convenient discharge of the molded pieces, which, as in the case of molded screw caps for which the present embodiment of the invention is adapted, are automatically unscrewed from the mold forms by ejector mechanism coacting with the exposed faces of the rotary drum.

The object of the invention is to improve the construction as well as the means and mode of operation of presses for molding plastics, whereby they may not only be cheaply and economically constructed, but will be more efficient in use, uniform in operation, automatic in action, and unlikely to get out of repair.

A further object of the invention is to improve the method of operation and molding apparatus whereby the cost of production will be greatly minimized.

A further object of the invention is to provide means for presenting the molded pieces in position for conveniently and rapidly releasing them from the press.

A further object of the invention is to provide automatic unloading or discharging means for the molded pieces.

A further object of the invention is to increase production and rapidity of operation by enabling a group of pieces to be molded while a like group of previously molded articles are being removed from the apparatus.

A further object of the invention is to eliminate the necessity for inserting and removing heavy mold plates into and from the press at each operation.

A further object of the invention is to minimize the necessary labor requirement.

A further object of the invention is to provide improved means for removing condensate from the rotary steam heated drum.

A further object of the invention is to provide means for automatically discharging water of condensation by the rotary motion of the drum.

A further object of the invention is to minimize construction by providing an apparatus applicable to a conventional molding press.

A further object of the invention is to provide a molding apparatus and method of procedure possessing the meritorious features and desirable characteristics hereinafter mentioned.

With the above primary and other incidental objects in view, as will more fully appear in the specification, the invention consists of the features of construction, the parts and combinations thereof, and the mode of operation, or their equivalents, as hereinafter described and set forth in the claims.

In the drawings wherein is shown the preferred, but obviously not necessarily the only form of embodiment of the invention, Fig. 1 is a front elevation of a molding press for plastics embodying the present invention. Fig. 2 is an end elevation thereof. Fig. 3 is a front elevation on enlarged scale of the rotary drum and coacting mold plates and associated parts. Fig. 4 is an end elevation on like scale of the parts illustrated in Fig. 3. Fig. 5 is a detail view of the drum positioning and holding means. Fig. 6 is a detail view of the automatic unloading mechanism for releasing molded pieces.

Like parts are indicated by similar characters of reference throughout the several views.

While for illustrative purposes, and for economy of construction, but with no intent to unduly limit the scope or application of the invention, the present invention is herein shown and described as applied to a conventional type of reciprocatory molding press, it is to be understood that it may be embodied in specially constructed form other than that illustrated and that the invention is not limited to the particular form of installation.

In the drawings 1 indicates the base of the press from which arise relatively spaced upright columns 2—2 carrying at their tops a fixed head or stationary platen 3. Adjacent to the base 1 and adjustable to different elevations upon the columns in any of which positions it may be fixedly secured, is a stationary platen or knock-out head 4. Slidingly mounted for vertical movement upon the columns above the stationary platen or knock-out head 4 is a traveling platen 5. Secured to the stationary upper head or platen 3 at the top of the press is a grid or bolster 7 to which is fixedly attached a steam plate 8. To the upper steam plate 8 is stationarily secured a cavity plate or mold plate 9, which in the present instance contains the matrices of the molds. Secured to the traveling platen 5 at the lower portion of the machine is a like set of parts, i. e., a lower grid or bolster 7', a steam plate 8' and a cavity or mold plate 9' identical with the upper set of parts except that the lower set of parts is mounted for to and fro vertical motion upon the traveling platen. The steam plates 8 and 8' have passages therethrough for circulation of live steam by which the cavity or mold plates 9 are maintained at high molding temperature.

The press parts thus far described other than the use of duplicate cavity plates are those of a conventional reciprocatory press and apart from the combination hereafter claimed form no part per se of the present invention.

Located intermediate the upper and lower platens and associated steam plates and cavity plates is a revoluble polygonal drum 10 carrying upon its opposite sides force plates 11 complementary to the cavity plates 9 and 9' and carrying mold parts or "forces" 12 coacting therewith. Merely for illustrative purposes the mold elements illustrated are those for producing caps for bottles or other containers, the female portions of the molds or matrices being formed in the mold plates 9 and 9' while the male portions or "forces" of such multiple molds are carried by the force plates 11.

In the present instance the drum 10 is of rectangular form and rotates on a horizontal axis. Obviously it may be of other polygonal shapes and may be otherwise mounted, as for example for rotation on a vertical axis, by which succeeding portions are presented in cooperative relation with the upper and lower mold plates 9 and 9'. The drum 10 is mounted for rotation upon hollow trunnions 13 secured to its opposite ends and journaled in roller bearings 14 in vertically movable mounting heads 15. The drum has therein a helical steam passage 16 communicating with the hollow trunnions 13 at its opposite ends, through one of which live steam is introduced to heat the force plates and mold elements or forces carried by the drum. The spent steam and condensate is discharged through the opposite hollow trunnion. The condensate which collects in the helical passage 16 as result of steam condensation is automatically advanced through the helical passage by the rotation of the drum and is eventually discharged through the outlet trunnion.

By this means the drum is automatically drained and the water of condensation is continuously discharged keeping the steam passage 16 clear of condensate at all times.

The mounting heads for the drum are guided in their vertical movement by studs or pins 17 extending upwardly and downwardly therefrom adjacent to each corner and having sliding engagement in bearings in the upper and lower steam plates and cavity plates adjacent to the opposite margins thereof and beyond the mold cavities. The drum is thus capable of a "floating" movement between the upper and lower sets of steam and cavity plates. Extending upwardly from the mounting heads 5 intermediate the guide studs 17 are multiple suspension rods 18 fixed in the heads 15 and having sliding engagement through corresponding holes in the ends of the upper steam plate 8 and cavity plate 9, beyond which they are provided with heads or nuts 19 which limit their descent and thereby suspend the drum in mid-position between the upper and lower molding units when the press is open.

At such times the drum is further supported from below by means of push rods or "knock-out" pins 20 carried by a vertically movable knock-out plate 21 within the lower grid or bolster 7'. The grid or bolster is recessed and of ample height to permit the knock-out plate 21 a range of movement substantially equal to the space between the drum and cavity plate when the press is open. The knock-out plate normally tends to descend to the bottom of this space where it rests upon the traveling platen 5. The knock-out plate 21 is provided with downwardly extending studs or pins 22 which project through the traveling platen 5 and contact the stationary platen or lower head 4 as the traveling platen descends, thereby arresting the descent of the knock-out plate and with it the drum which is then supported by the pins or studs 20 carried by the knock-out plate while the platen 5 carrying the steam plate 8' and cavity plate 9' continues to descend thereby retracting the lower force plate away from the complementary cavity or mold plate carried by the drum.

The drum 10 is automatically partially rotated by the operation of the press as it approaches its wide open position. Indexing means is provided for arresting the drum in its successive rotative positions with the force or mold plates parallel with the cavity plates and the forces 12 in exact registry with the mold cavities. Such rotative motion is effected by a pawl arm 23 pivotally connected with a traveling part carried by the reciprocatory head 5. The pawl arm has a shoulder or tooth 24 engageable successively with a series of studs 25 eccentrically located in different radial positions in the end of the drum trunnion 13. The pawl arm 23 is spring actuated into engaging relation with the studs. The upper side of the pawl tooth 24 is inclined so that on the upward travel of the lower head 5 the arm 23 will be cammed aside against the tension of its spring 23', while upon the return motion the tooth 24 will engage the upper stud 25 as the platen head 5 descends thereby pulling downwardly upon the eccentrically positioned stud 25 to rotate the drum through a partial turn, thereby presenting succeeding force plates 11 in position for cooperation with the respective cavity plates 9 and 9'.

To index the drum that it may be arrested and held in predetermined adjusted relation with the platen heads and mold plates, one trunnion 13 of the drum is provided with peripheral lugs or projections 26 at circumferentially spaced points with which engage notched locking levers 27 and 28. The projections 26 and corresponding notches of the levers 27 and 28 are somewhat tapered or wedge shaped. The lever 27 is pivoted at 29 to the adjacent head block 15. The second locking lever 28 is pivoted at 30 to the same head block. These levers are interconnected by a link 31 whereby the oscillation of one of the levers to disengage its notch from the locating projection 26 will cause a corresponding disengaging motion of the other lever. A retracting spring 32 urges the locking levers simultaneously into engaging relation with the projections 26.

To effect automatic disengagement of the locking levers and permit partial rotation of the drum at the proper point in the cycle of operation there is provided a standard 33 (Figs. 1, 5 and 6) projecting upwardly from a base 34 secured to the movable mold plate or any other portion moving with the lower head 5. The standard 33 carries adjacent to its top a pivoted cam member 35 the free end of which abuts against a flange 36 upon the standard 33, which limits its movement in one direction, and against which it is urged by a suitable spring, (not shown). The locking lever 27 carries at its upper end a stud 37 which engages with the pivoted member 35 first in one direction and then in the other during movement of the press. As the press closes and the lower head 5 and mold plate 9' move upwardly, the pivoted member 35 engaging the under side of the stud 37, will be forced aside and will pass idly by the stud. However, upon the opening movement of the press and consequent descent of the standard and pivoted cam member 35, the inclined lower side of the cam member 35 engages the stud 37 of the lever 27 forcing the lever away from the drum trunnion 13, as shown by dotted lines in Fig. 6.

This movement is transmitted through the interconnecting link to the companion locking lever 28, causing simultaneous disengagement of both levers. This unlocking action occurs just prior to the engagement of the pawl shoulder 24 with one of the studs 25, and by continued movement the drum is given a partial rotation while the locking levers are held in disengaged relation by the stud 37 passing beyond the came member 35. Upon the stud 37 passing beyond the cam 35 the levers 27 and 28 are released for reengagement with the projections 26 to lock the drum in its newly adjusted position.

When molding bottle caps or like units which are screw threaded, the molded units must be unscrewed from the mold plugs or forces 12. This is rapidly and economically effected by employing an electric drill, to the spindle of which is affixed a rubber chuck or head which being pressed against successive molded caps while rapidly rotating serves to quickly and easily remove the caps from their screw threaded mold studs. The caps fall into a receiving trough not shown and by gravity flow into boxes or barrels.

An operator equipped with an electric drill provided with a rubber chuck on its spindle is stationed on each side of the press. The slugs or button of material are assembled on perforated loading plates outside the press, the perforations of which agree with the spacing of the mold cavities and studs 12. These loading plates carrying properly spaced material slugs are inserted above and beneath the drum each time the press is opened and the drum turned. By withdrawing an associated slide the slugs are dropped through the perforations of the loading plate into the cavities or onto the studs 12 and the plate is withdrawn. The press is closed and while two lots of units are being molded, one above and the other beneath the drum, the operators at opposite sides rapidly remove the caps molded at the previous operation by application of their rubber chuck equipped electric drills. The drum and mold plates may be materially increased in size beyond that shown in the drawings, thereby greatly increasing the capacity of the press, and minimizing costs of production.

It is proposed to provide mounting heads on opposite sides of the press, each provided with multiple rotating spindles registering with the mold studs 12 of the drum, and automatic means for drawing the spindles toward the drum to engage the heads of the spindles with the newly molded caps as the drum is turned after each molding operation, to thereby simultaneously unscrew all the caps, after which the spindle heads will be retracted. Such automatic unloading means is not illustrated in the present disclosure, but, as now advised, will form the subject matter of a separate application.

While the drum 10 and the respective mold plates 9 and 9' are ordinarily steam heated, it is to be understood that either or both may be heated by electrical heating elements associated therewith.

From the above description it will be apparent that there is thus provided a device of the character described possessing the particular features of advantage before enumerated as desirable, but which obviously is susceptible of modification in its form, proportions, detail construction and arrangment of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a molding press for plastics, a main frame, a stationary platen, and a relatively movable platon, mold plates carried by the respective platens, a rotary polygonal drum interposed between the platens and bodily movable toward and from the stationary platen, mold plates complementary to those carried by the platens mounted thereon, the mold plates on opposite sides of the drum being brought to cooperative relation with the first mentioned mold plates by successive partial rotations of the drum, and means for actuating the drum through a partial rotation under control of and in timed relation with the movement of the movable platen.

2. In a molding press for plastics, a main frame, a pair of relatively movable platens carried thereby, a mold plates carried by the respective platens, a floating polygonal drum interposed, for relative shifting movement, between the platens, complementary mold plates carried thereby and arranged in pairs on opposite sides of the drum, succeeding pairs of mold plates being positioned in cooperative relation with the mold plates carried by the platens by partial rotation of the drum, means for moving at least one of the platens and the drum toward the other platen to afford molding pressure between the respective cooperating mold plates carried thereby, and means under the control of said moving platen for rotating the drum to present successive pairs of mold plates carried thereby in operative position.

3. In a molding press for plastics, a main frame, a stationary platen and a relatively movable platen mounted thereon, mold plates carried by the respective platens, a rotary polygonal drum interposed between the platens and mold plates, complementary mold plates carried by the drum, mountings for the drum in which the drum is capable of rotary motion about its axis and reciprocatory motion transversely of its axis, means for moving the platens and drum relative to each other to move the mold plates carried thereby into and out of operative engagement, and means acting in response to movement of said movable platen for moving the drum through a partial rotation to present mold plates carried by succeeding faces thereof in cooperative relation with those carried by the platens.

4. In a press for molding plastics, a main frame, a pair of relatively movable platens including a stationary platen and a movable platen mounted thereon, mold plates carried by the respective platens, a rotary member interposed between the platens and movable toward and from the stationary platen, a set of mold plates complementary to those carried by the platens located in cooperative relation therewith on opposite sides of said interposed member and adapted to simultaneously engage with the corresponding mold plates carried by the platens to effect separate molding operations simultaneously, and means for relatively moving the interposed member into engagement with the stationary platen and for moving the movable platen into engagement with said interposed member to afford molding pressure between the respective mold plates.

5. In a press for molding plastics, a main frame, relatively movable platens carried thereby, mold plates carried by the platens, a polygonal drum mounted for rotary motion between the platens, successive pairs of complementary mold plates mounted respectively on opposite faces of the polygonal drum, and progressively moved by rotation thereof into cooperative relation with the mold plates carried by the platens and therefrom into positions accessible for discharge of molded articles, the members of the pair of mold plates positioned in cooperative relation with those carried by the platens being simultaneously engageable therewith to exert molding pressure therebetween, means for relatively moving the drum into engagement with one of the platens and the other platen into engagement with the drum to exert molding pressure between the cooperative mold plates carried thereby, and means for rotating the drum to present a succeeding pair of mold plates upon the drum in operative position.

6. In a molding press for plastics, a main frame, a pair of relatively movable platens carried thereby, mold plates carried by the respective platens, a rotary carrier intermediate the platens, floating bearings for the carrier enabling to and fro movement thereof additional to its rotary movement, multiple pairs of mold plates carried by the rotary carrier complementary to those carried by the platens and successively moved into cooperative relation therewith by rotation of the carrier, the carrier being engaged between the platens to simultaneously produce two lots of moldings by the cooperation of the mold plates carried by the carrier and platens respectively upon relative approaching movement of the platens and means under control of the separation movement of one of said platens to rotate the rotary carrier to present successive pairs of mold plates to the platen.

7. In a molding press for plastics, a main frame, a pair of relatively movable platens, mold plates carried thereby, a succession of oppositely disposed pairs of complementary mold plates progressively presented in cooperative relation between the first mentioned mold plates, a yielding mounting therefor, means for relatively moving the platens to induce opposing equalized molding pressure between the mold plates carried by the platens and the interposed complementary mold plates, and means acting in response to platen movement for automatically advancing the last mentioned succession of pair of mold plates in timed relation with the relative movement of the platens.

8. In a molding press for plastics, a main frame, relatively movable platens, mold plates carried thereby, oppositely disposed complementary mold plates arranged in pairs, a traveling carrier therefor mounted for rotation about an axis for presenting successive pairs of the last mentioned mold plates in cooperative relation with the first mentioned mold plates, floating mounting means for the carrier enabling bodily movement thereof in unison with one of the platens and relative to the other platen, and means for moving the platens to effect simultaneous engagement of the mold plates carried thereby with the complementary mold plates and means acting in response to separation movement of said platen for rotating said carrier to present successive pairs of mold plates to the platen.

9. In a molding press for plastics, a main frame, a reciprocatory platen, a stationary mold plate associated therewith, a plurality of complementary mold plates, to which the first mentioned mold plate is common, progressively movable into cooperative relation therewith, means for moving the complementary plates successively into cooperative relation with the common mold plate, a yielding mounting for the complementary mold plates initially yielding to the movement of the platen, and means for effecting a further relative movement of the common mold plate and the complementary mold plate in cooperative relation therewith to effect pressure molding operation.

10. In a molding press for plastics, a reciprocatory platen, a stationary platen, mold plates carried thereby, a plurality of complementary mold plates, a rotary carrier therefor and means under control of and actuated by platen movement for advancing the carrier through successive partial rotations in timed relation with the movement of the reciprocatory platen to successively present said complementary mold plates in coooperative relation with the mold plate carried by the reciprocatory platen, a floating mounting for the carrier whereby the carrier is capable of yielding movement in unison with the movement of the reciprocatory platen, and means for effecting a further relative movement of the said mold plates when in cooperative relation to afford molding pressure therebetween.

11. In a molding press for plastics, a main frame, a stationary platen mounted thereon, a mold plate carried by the stationary platen, a pivotally mounted carrier, multiple mold plates carried thereby and movable alternately into cooperative relation with the mold plate carried by the stationary platen and into inoperative position for discharge of molded articles by the pivotal movement of the carrier, a movable platen, a mold plate carried thereby, said movable platen being capable of advancing and retracting the carrier toward and from the stationary platen to effect molding pressure between the respective plates carried by the stationary platen and the pivotally mounted carrier by the platen when brought to cooperative relation by rotation of the carrier, and means acting in response to movement of the movable platen for swinging said pivotally mounted carrier to present the mold plates in position where they are accessible for removal of the molded articles.

12. In a molding press for plastics, a main frame, a stationary platen, and a relatively movable platen, mold plates carried by the respective platens, a rotary polygonal drum interposed between the platens, and bodily movable toward and from the stationary platen, mold plates complementary to those carried by the platens mounted thereon, the mold plates on opposite sides of the drum being brought to cooperative relation with the first mentioned mold plates by successive partial rotations of the drum, means for locking the drum in molding position, and means for releasing the drum and actuating it through a partial rotation under control of and in timed relation with movement of the platen.

13. In a molding press for plastics, a main frame, a stationary platen, and a relatively movable platen, mold plates carried by the respective platens, a rotary polygonal drum interposed between the platens, and bodily movable toward and from the stationary platen, mold plates complementary to those carried by the platens mounted thereon, the mold plates on opposite sides of the drum being brought to cooperative relation with the first mentioned mold plates by successive partial rotations of the drum, means for locking the drum in molding position, means controlled by movement of the platen for releasing the drum for rotative movement, and means for actuating the drum through a partial rotation under control of and in timed relation with movement of the platen.

FREDERICK A. NOVAK.
HARRY B. HARN.

CERTIFICATE OF CORRECTION.

Patent No. 2,141,195. December 27, 1938.

FREDERICK A. NOVAK, ET AL.

It is hereby certified that error appears in the printed specification of the above numbered patent requiring correction as follows: Page 3, first column, line 30, for "came" read cam; and second column, line 34, claim 1, for "platon" read platen; page 4, second column, line 47, claim 10, for "coooperative" read cooperative; lines 71 and 72, claim 11, strike out the words "by the platen"; and that the said Letters Patent should be read with this correction therein that the same may conform to the record of the case in the Patent Office.

Signed and sealed this 28th day of February, A.D. 1939.

Henry Van Arsdale.

Acting Commissioner of Patents.

(Seal)